United States Patent [19]
Renzo et al.

[11] Patent Number: 5,700,498
[45] Date of Patent: Dec. 23, 1997

[54] MOLDING APPARATUS

[75] Inventors: Bernard Renzo; Michel Robinault, both of Nantes; Didier Urbain, Saint Gemmes d'Aubigne, all of France

[73] Assignee: Draftex Industries Limited, Edinburgh, Scotland

[21] Appl. No.: 529,423

[22] Filed: Sep. 18, 1995

[30] Foreign Application Priority Data

Oct. 3, 1994 [GB] United Kingdom .................. 9419916

[51] Int. Cl.$^6$ .................................................. B29C 49/04
[52] U.S. Cl. .......................... 425/532; 264/523; 264/526; 425/73; 425/541
[58] Field of Search .......................... 425/526, 532, 425/541, 73; 264/500, 526, 523, 540

[56] References Cited

U.S. PATENT DOCUMENTS

| | | | |
|---|---|---|---|
| 3,662,048 | 5/1972 | Turner | 264/85 |
| 4,034,036 | 7/1977 | Farrel | 264/89 |
| 4,192,843 | 3/1980 | Trieschock et al. | 425/526 |
| 4,865,799 | 9/1989 | Sadr | 425/532 |

FOREIGN PATENT DOCUMENTS

| | | |
|---|---|---|
| 0301694 | 2/1969 | European Pat. Off. . |
| 57-128517 | 11/1982 | Japan . |
| 63-280614 | 2/1989 | Japan . |
| 92/14599 | 9/1992 | WIPO . |

OTHER PUBLICATIONS

Drusche, "Seamless Solutions," *European Plastics News,* 21, 21–22 (1994).

*Primary Examiner*—Jay H. Woo
*Assistant Examiner*—Iurie A. Schwartz
*Attorney, Agent, or Firm*—Leydig, Voit & Mayer, Ltd.

[57] ABSTRACT

Apparatus for blow-molding an article curved in three dimensions comprises two horizontally movable mold parts which, when in contact with each other, define a mold cavity curved in three dimensions to match the required article. An extrusion head extrudes a parison of synthetic resin material into the cavity so that it descends towards the lower end thereof. During this process, a first air flow is fed through apertures in a cover and passes through the mold cavity around the outside of the parison to ease the passage of the parison towards the lower end. In addition, a second air flow is fed through a nozzle in the extrusion head into the interior of the parison so as to help it descend and also to prevent its distortion as it moves into the mold cavity. Thereafter, closure members, which are slidable on, but movable independently of, the main mold parts, close off the upper and lower ends of the mold cavity and pinch the parison between them, their movements being controlled by respective actuators. Blow-molding then takes place in order to produce the required article. The mold parts are then separated. The article remains suspended by the closure members and can be grabbed by a manipulator arm or a robot arm and then removed after separation of the closure members.

24 Claims, 5 Drawing Sheets

Fig.8

MOLDING APPARATUS

BACKGROUND OF THE INVENTION

The invention relates to molding apparatus and moulding methods. Molding apparatus and methods according to the invention, which will be described in more detail below by way of example only, enable the blow-molding of parts bent or curved in three dimensions. Such parts may, for example, be in the form of hoses or pipes having a pre-formed curved or bent configuration such as for use in the cooling, heating or air conditioning systems of motor vehicles. However, such parts may have other applications instead.

SUMMARY OF THE INVENTION

According to the invention, there is provided molding apparatus for blow-molding an article curved in three dimensions, comprising two mold parts mounted to be movable relative to each other between a first, mutually separated, position and a second, closed, position in which the two mold parts together define a mold cavity curved in three dimensions to match the shape of the article, the mold cavity having first and second longitudinally spaced ends at least the first of which is open, extrusion means for extruding a parison of synthetic resin material into the cavity through the first end thereof, closure means movable independently of movement of the mold parts for closing the open end or each open end of the mold cavity when the parison is in position therein, blow-molding means for blow-molding the parison in the cavity to form the said article, and flow means for providing a flow of air or other gas between the outside of the parison as it passes into the mould cavity and the wall of the mold cavity, whereby to facilitate the passage of the parison into the mold cavity.

According to the invention, there is further provided molding apparatus for blow-molding an article curved in three dimensions, comprising a base, two mold parts mounted on the base to be slidable in generally horizontal directions towards and away from each other between an open position in which they are separated and a closed position in which they are in contact with each other and together define a mold cavity curved in three dimensions to match the shape of the article, the mold cavity having upper and lower ends at least the upper of which is open, actuator means operative to move the mold parts into the closed position, an extrusion head mounted above the upper end of the mold cavity for extruding a parison of synthetic resin material into the mold cavity through the upper end and towards the lower end, air flow means for passing a first flow of air through the cavity from the upper end to the lower end and between the outside of the parison and the mold cavity to facilitate the movement of the parison into the mold cavity and a second flow of air into the interior of the parison to minimise distortion of the parison during the said movement of the parison, blow-molding means operative to blow-mold the parison in the mold cavity after stopping of the first and second flows of air whereby to produce the said article, closure means operative independently of the movement of the mold parts to maintain the open end of the mold cavity closed during operation of the blow-molding means, and actuator means for moving the mold parts into the open position to enable removal of the molded article.

According to the invention, there is also provided a method of blow-molding an article curved in three dimensions, comprising the steps of moving two mold parts into contact with each other so that, together, they define a mold cavity curved in three dimensions and matching the shape of the article and having longitudinally spaced first and second ends at least the first of which is open, extruding a parison of synthetic resin material into the cavity through the first end and towards the second end, providing at least a first flow of air into the mold cavity from the first end towards the second end and between the outside of the parison and the mold cavity to facilitate the movement of the parison towards the second end, closing off the or each open end of the mold cavity when the parison fully inserted into the mold cavity, and blow-molding the parison in the cavity to form the said article.

DESCRIPTION OF THE DRAWINGS

Moulding apparatus according to the invention will now be described, by way of example only, with reference to the accompanying diagrammatic drawings in which.

DESCRIPTION OF PREFERRED EMBODIMENTS

Figure 1:
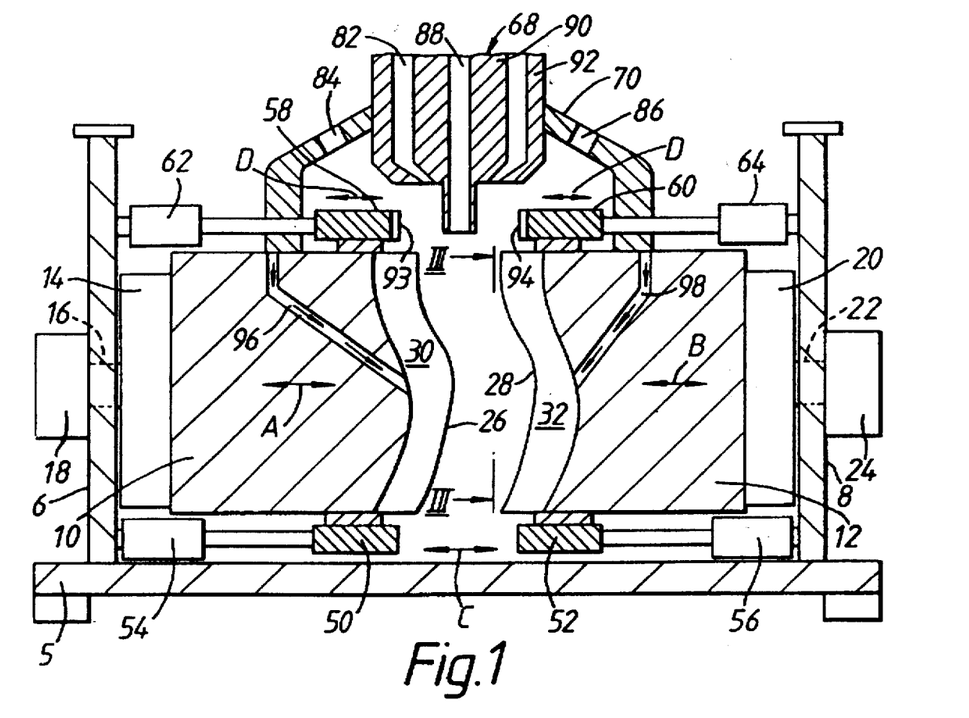
FIG. 1 is a cross-section through part of one form of the molding apparatus in an initial setting.

Referring to FIG. 1, the apparatus is mounted on a base 5 between two upright stanchions 6 and 8. These stanchions support two main mold parts 10 and 12. Mould half 10 is supported by and rigidly attached to a plate 14 supported by a horizontal arm 16 (see FIG. 2) slidably extending through the stanchion 6 and connected to an actuator 18. The actuator 18 may be of any suitable form, such as a hydraulic actuator. It can be activated so as to move the arm 14 in the direction of the arrow A, thus moving the mold part 10 towards and away from the mold part 12.

The mold half 12 is mounted in the same way. Thus, it is rigid with a plate 20 carried by a support arm 22 which is slidable in the stanchion 8 and connected to an actuator 24 for moving the arm 22 in the direction of the arrow B. Thus, the actuator 24 can be operated to move the mold part 12 towards and away from the mold part 10.

Figure 2:
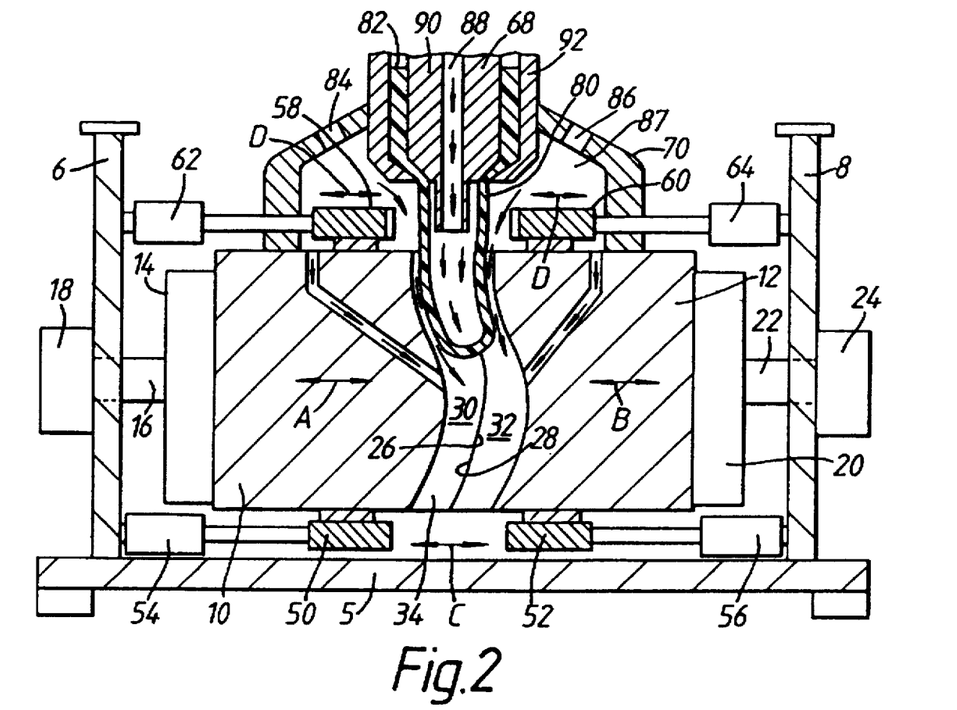
FIG. 2 corresponds to FIG. 1 but shows the apparatus in a working configuration.

The facing surfaces 26,28 of the mold parts 10,12 are respectively formed with respective halves 30,32 (see FIGS. 1 and 2) of a mold cavity 34 (FIG. 2). Each half of the mold cavity 34 is curved in three dimensions (see FIG. 3 which shows the half 32).

Figure 3:
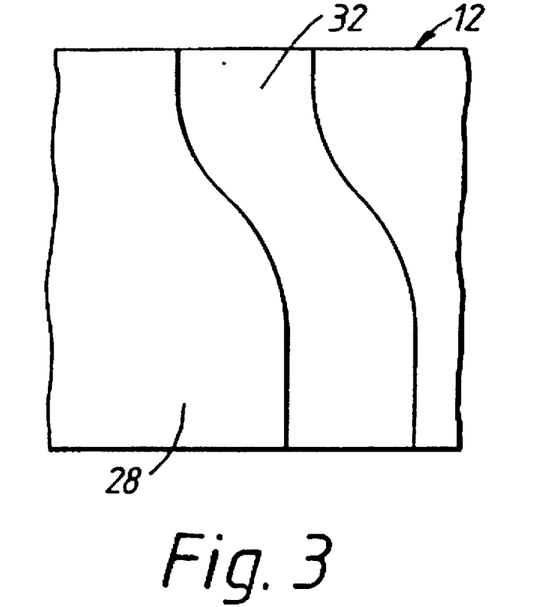
FIG. 3 is a section on the line III—III of FIG. 1.

The two main mold parts 10,12 can be moved towards each other so that their surfaces 26,28 (except where the two halves 30,32 of the mold cavity are respectively defined in these surfaces) come into contact with each other as shown in FIG. 3. The two halves 30,32 of the mold cavity are thus closed together to define the complete mold cavity 34. This mold cavity is shaped to match the outside surface of the article to be molded.

The apparatus also includes lower and upper pairs of closure members. The lower closure members are shown at 50 and 52. They are respectively slidably mounted on the lower surfaces of the main mold parts 10 and 12, such as by a key and keyway arrangement (not shown), so as to be slidable in the direction of the arrows C. This sliding movement is under the control of actuators 54 and 56 mounted on the stanchions 6 and 8. The upper closure members are shown at 58 and 60. These members are slidably mounted on the upper surfaces of the main mold parts 10,12 such as by a key and keyway arrangement. They are slidable in the direction of the arrows D under control of actuators 62 and 64 which are supported on the stanchions 6 and 8.

In its upper region, the apparatus includes an extrusion head 68 and a cover plate 70. The extrusion head 68 and the cover plate 70 are supported directly or indirectly from the stanchions 6,8 by means not shown. The lower surface of the cover 70 makes sealing contact with the upper faces of the main mold parts 10,12 but in a manner which enables the mold parts to slide horizontally relative to the cover 70.

The operation of the molding apparatus will now be described.

The initial positions of the main mold parts 10,12 and the lower and upper closure members 50,52,58,60 are shown in FIG. 1. When a molding operation is to take place, the main mold parts 10,12 are caused to move towards each other by operation of the actuators 18,24, until their surfaces 26,28 come into contact with each other as shown in FIG. 3, thus forming the mold cavity 34. The lower and upper closure members 50,52,58,60 initially remain in the positions illustrated in FIGS. 1 and 2.

The extrusion head 68 is now activated and extrudes a parison of synthetic resin 80 through an extrusion die 82, directing the parison downwardly into the mold cavity 34. As this process begins, a flow of air (or other suitable gas) is directed into the cavity 34 from a suitable source through apertures 84,86 leading into the interior 87 under the cover 70 and hence into the mold cavity 34. This air flow, indicated by the arrows, flows into the mold cavity and downwardly therethrough, around the outside of the parison 80 as it is extruded into the cavity, thus guiding the parison and keeping it clear of the internal wall of the mold cavity.

Simultaneously with this process, a further air or gas flow is injected into the interior of the parison 80 through a nozzle 88 which is mounted centrally within the extrusion head 68. This air flow into the interior of the parison helps to ensure that the parison maintains a desired shape and does not become damaged or distorted or partially collapsed by the extrusion process and by the process of feeding it into and through the mold cavity.

It will be understood that the parameters of the exterior and interior air flows (pressure, temperature, flow rate) can be regulated to facilitate the extrusion process and (for example) to prevent the material of the parison from becoming over-cool or partially solidified.

When the parison 80 has become fully inserted into the mould cavity 34 (which may be detected by a suitable detector not shown), an inner part 90 of the extrusion head 68 moves downwardly relative to the outer part 92 and thus closes the extrusion die 82. The air flows through the holes 84 and 86 and through the nozzle 88 are cut off. Actuators 62 and 64 are then activated and the two closure members 58 and 60 are moved towards each other so as to close off the upper of the two longitudinally space ends of the mold cavity 34. The meeting faces of the closure members 58,60 are shaped with concave ends shown at 93 and 94 so as to surround the lower end of the nozzle 88. At the same time, actuators 54 and 56 are activated and move the closure members 50 and 52 towards each other so as to close off the lower of the two longitudinally space ends of the mold cavity 34. The blow-molding operation now takes place, the blow-molding air supply being fed into the interior of the parison through the nozzle 88. The closure members of each pair pinch the parison between them.

At the end of the blow-molding operation, the two main mold parts 10,12 are withdrawn away from each other into the position shown in FIG. 1. This process is carried out by means of the actuators 18 and 24. When the two mold parts are withdrawn away from each other in this manner, the moulded article will be held in a fixed position with its two ends being respectively supported by the closed pairs of closure members 50,52 and 58,60. A manipulating arm or other automatic system such as a robot arm then grabs the parison. The closure members 50,52 and 58,60 are then withdrawn away from each other by means of their respective actuators. The moulded article is then removed.

FIGS. 1 and 2 also show a modification in which two (in this example) additional airways 96 and 98 are formed through the main mould parts 10,12, connecting particular regions within the two halves of the mold cavity 34 to the upper faces of the main mold parts. When the main mold parts 10,12 are moved into contact with each other, as shown in FIG. 2, these airways 96,98 become connected to the interior under the cover 70. Instead, however, they can be supplied with air from another source. In this way, the airways 96,98 conduct additional flows of air into the mold cavity to supplement the flow of air into the mold cavity from its top and flowing round the exterior of the parison. These supplementary air flows assist the downward movement of the parison. They are particularly useful when the mold cavity is sharply curved or of significant length. The outlets of the airways 96,98 are thus appropriately positioned according to the shape of the mold cavity. There may of course be more than two such airways. For example, there could be a plurality of such airways having their outlets all lying in the same horizontal plane. Instead, or in addition, there could be airways having outlets lying in different horizontal planes. The outlet of each airway, where it connects with the mold cavity, is provided with a one-way valve, lying in the local plane of the wall of the cavity, to close off the airway when air flow stops and molding begins.

Figure 4:
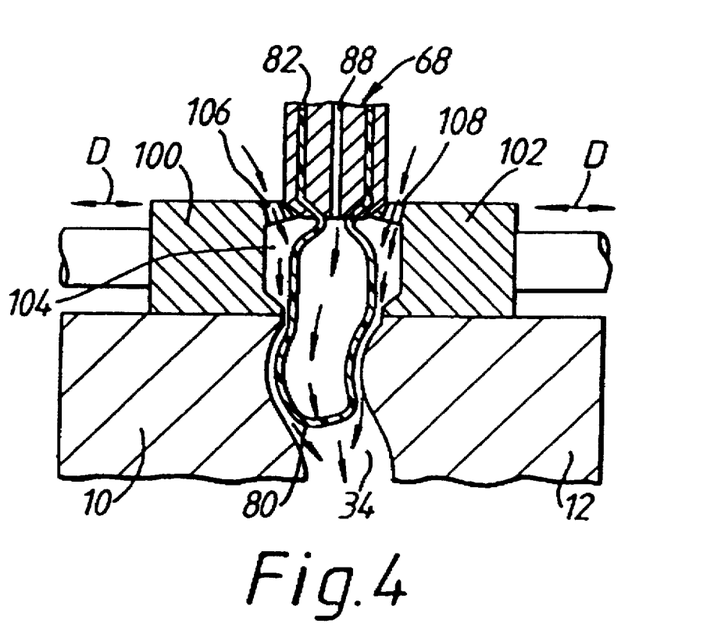
FIG. 4 is a cross-section of part of a modified form of the apparatus of FIGS. 1 to 3 during an early stage in the molding method carried out by the apparatus.
Figure 5:
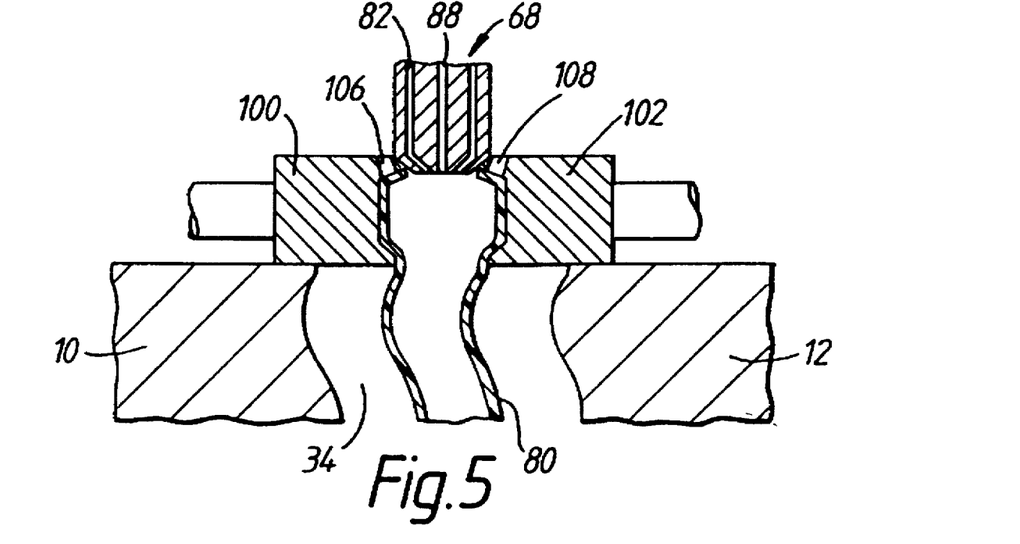
FIG. 5 corresponds to FIG. 4 but shows a later stage in the method.

FIG. 4 and 5 shows a modification to the upper part of the apparatus of FIGS. 1 to 3 and parts in FIGS. 4 and 5 corresponding to those in the previous Figures are similarly referenced.

In the modification of FIGS. 4 and 5, the functions of the cover 70 and the closure members 58 and 60 of FIGS. 1 to 3 are combined together. As shown in FIG. 4, modified closure members 100 and 102 are used instead of the closure members 58 and 60 and the cover member 70 of the previous Figures. The closure members 100 and 102 are connected to be moved in the direction of the arrows D by the actuators 62 and 64 (see FIGS. 1 to 3).

During the initial process, in which the parison 80 is fed into the mold cavity (after the two main mold parts 10,12 have been moved into contact with each other—see FIG. 2), the closure members 100,102 are in the closed position as shown in FIG. 4. As indicated, they are in contact with the end of the extrusion head 68, thus forming a closed chamber 104 corresponding to the closed cavity chamber 87 of FIGS. 1 to 3. As before, the parison 80 is extruded from the extrusion head 68 through the die 82 and through this chamber 104 and into the mold cavity. As before, this process is facilitated by a flow of air into the mold cavity 34 and around the outside of the parison 80, this flow of air entering the chamber 104 through apertures 106 and 108. In addition, a flow of air is fed into the interior of the parison through the nozzle 88 as the parison is fed into the mold cavity.

When the parison has become fully inserted into the mold cavity, the lower end of the mold cavity is closed off by the closure members 50,52 (see FIG. 2) in the manner already explained. The extrusion head 68 is then activated to close off the die 82, and blow-molding takes place under the effect of the blow-molding air which is blown into the interior of the parison through the nozzle 88.

During the molding operation, the closed chamber 104 forms a continuation of the mold cavity 34 and is thus of course appropriately shaped according to the desired shape of the corresponding end of the article to be moulded.

Upon completion of the molding operation, the main mold parts 10,12 are separated in the manner already described. As shown in FIG. 5, the molded article 80 is thus held supported at its upper end by the closure members 100 and 102 and at its lower end by the closed closure members 50,52 (see FIG. 2). As before, the molded article can thus be grabbed by a manipulated arm or a robot arm. The closure members 100,102 are then withdrawn away from each other by the actuators 60,64 and the lower closure members 50,52 are also separated. The molded article can then be removed.

Figure 6:
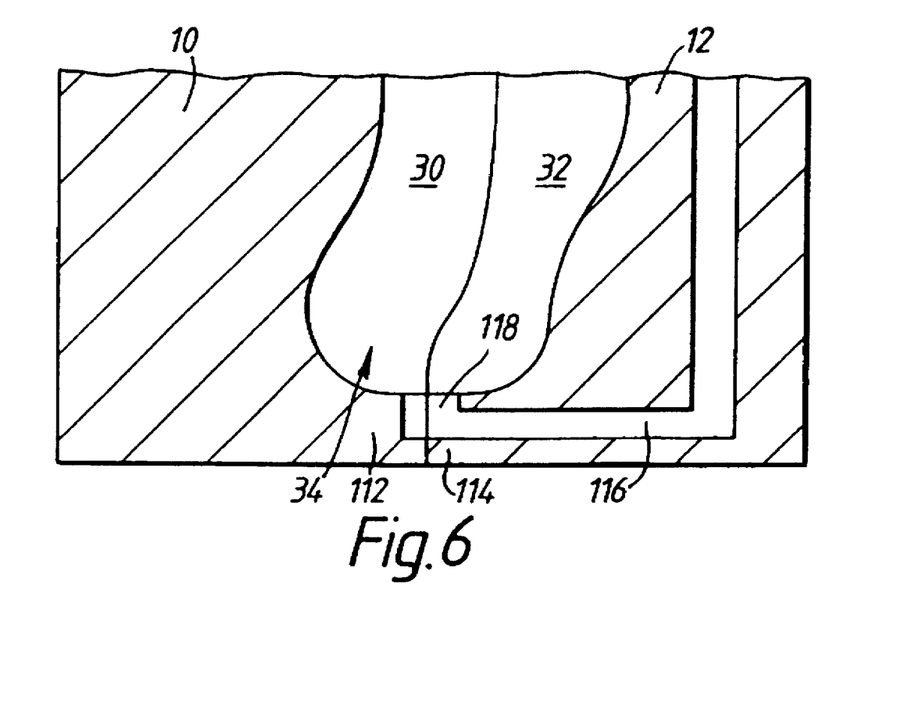
FIG. 6 is a cross-section through part of a further modified form of the apparatus of FIGS. 1 to 3.

FIG. 6 shows a further modification. FIG. 6 illustrates the lower portions of the main mold parts 10,12 which, in the modification shown in FIG. 6, have a modified shape at the lower end of the mold cavity. As shown in FIG. 6, the closure members 50,52 are not used in this modification. Instead, the two main mold parts 10,12 are formed at 112 and 114 so that, when the main mold parts are in contact with each other, they themselves form a closure for the lower end of the mold cavity 34. In addition, though, an airway 116 is formed within the mold part 12 (or mold part 10) and connects with the lower end of the mold cavity 34 via an orifice 118 which is formed by grooves respectively cut in the facing surfaces of the portions 112 and 114 of the mold parts. By means of this airway 116, air can be drawn from the lower end of the mold cavity 34 so as to flow around the outside surface of the descending parison. This air flow can replace or supplement the air flow supplied through the holes 84,86 (FIGS. 1 to 3) or holes 106,108 (FIG. 4 and 5). The airway 116 can be connected in any suitable way to a source of air pressure or suction. The molding operation is otherwise as already described.

Figure 7:
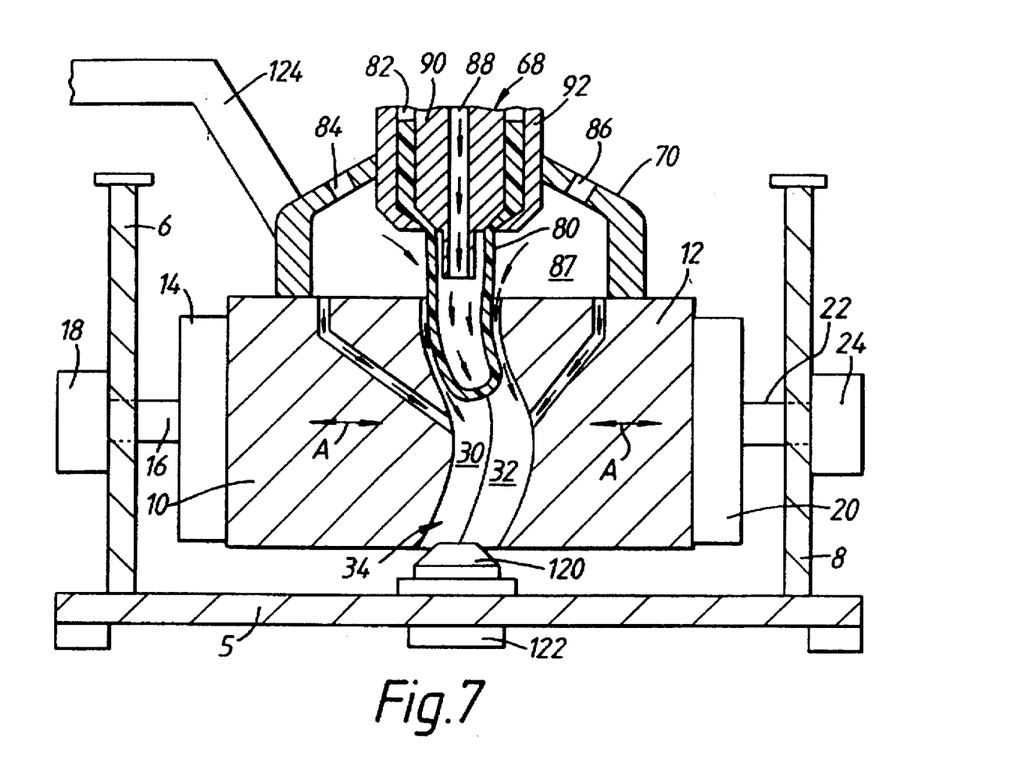
FIG. 7 is a cross-section through another modified form of the apparatus of FIGS. 1 to 3.
Figure 8:
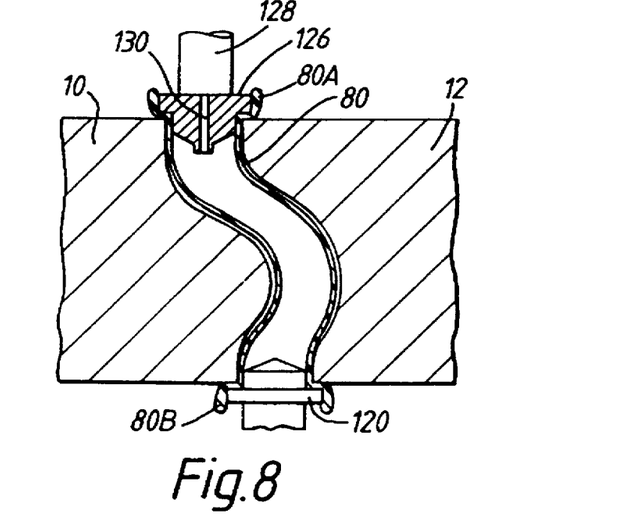
FIG. 8 shows part of the apparatus of FIG. 7 at a later stage in the molding method.

FIGS. 7 and 8 show a further modification. Parts in FIGS. 7 and 8 corresponding to those in FIGS. 1 to 3 are correspondingly referenced.

As shown in FIG. 7, this modified form of the apparatus does not have the lower and upper closure members 50,52, 58 and 60 for their respective actuators. Instead, a vertically movable closure member 120 is mounted on the base plate 5 and can be moved vertically by an actuator 122 in a manner to be explained. In addition, the assembly comprising the extrusion head 68 and the cover plate 70 is mounted on an arm 124 or other suitable mechanism by means of which they can be swung away from the mould parts 10,12.

Initially, after the two mold parts 10,12 have been moved into contact with each other as already explained in conjunction with FIG. 2, the apparatus has the configuration shown in FIG. 7. As before, the parison 80 is extruded into the mold cavity 34 and, simultaneously, air is blown around the outside of the parison through the holes 84 and 86 and into the interior of the parison through the nozzle 88, all to aid its descent into the mold cavity in the manner already explained.

When the parison reaches the lower end of the mold cavity, the extrusion is stopped. The lower closure member 120 is then raised by the actuator 122 so as to enter into and close off the lower end of the mold cavity as shown in FIG. 8. At the same time, the arm 124 removes the assembly comprising the extrusion head 68 and the cover plate 70 away from the top of the mold cavity. A combined upper closure member and blow-molding head 126 is then lowered into the upper end of the mold cavity by means of an arm 128 so as to close off this upper end. FIG. 8 shows that the lower and upper closure members 120 and 126 are shaped so as to provide the desired shapes for the ends of the article to be molded and grip the ends 80A and 80B of the parison. Blow-molding air is then blown into the parison through the member 126 via a nozzle 130 so as to carry out the molding operation.

Thereafter, the two main mold parts 10,12 are moved apart so as to leave the molded article held suspended between the upper and lower members 120,126. As before, it can be grabbed by a manipulating arm or robot arm which then removes the molded article after the closure members 120 and 126 have been moved in respective vertical directions away from the mould cavity.

In a modification, the cover plate 70 and the extrusion head 68 and the associated mechanism are not movably supported on the arm 124 but are fixed. Instead, the mold parts 10,12, and their associated mechanism, together with the closure member 120, are arranged to be movable sideways away from the cover plate 70 and the extrusion head 68 and into alignment with the closure member 126.

Any other suitable gas, instead of air, may be used for flowing around the outside of, and for blowing into the interior of, the parison during the injection process and also during the blow-molding operation. In this specification and the claims, the term "air" therefore includes any other suitable gas.

What is claimed is:

1. Molding apparatus for blow-molding an article curved in three dimensions, comprising two mold parts mounted to be movable relative to each other between a first, mutually separated, position and a second, closed, position in which the two mold parts together define a mold cavity curved in three dimensions to match the shape of the article, the mold cavity having first and second longitudinally spaced ends at least one of which is open, extrusion means for extruding a parison of synthetic resin material into the cavity through said one end thereof, the extrusion means comprising means adjacent said open end of the mold cavity for extruding the parison into the mold cavity, closure means movable independently of movement of the mold parts for closing said at least one end of the mold cavity when the parison is in position in the mold cavity, blow-molding means for blow-molding the parison in the cavity to form the said article, cover means defining an enclosure around the extrusion means and said one end of the mold cavity, and flow means comprising means for supplying a flow of air into the enclosure and thence into the mold cavity through said open end thereof and as the parison passes into the mold cavity, the flow of air flowing between the outside of the parison and the wall of the mold cavity and flowing towards the other end of the cavity whereby to facilitate the passage of the parison into the mold cavity.

2. Apparatus according to claim 1, in which the flow means includes further means for providing a flow of air into the interior of the parison as the parison passes into the mold cavity.

3. Apparatus according to claim 2 in which the further means of the flow means is mounted on the extrusion means.

4. Apparatus according to claim 3, in which the blow-molding means includes means for supplying blow-molding air into the interior of the housing through said further means of the flow means on the extrusion means.

5. Apparatus according to claim 1, in which the flow means further includes supply means for supplying air into the mold cavity through its wall at at least one position intermediate its ends.

6. Apparatus according to claim 5, including at least one airway extending between two open ends and defined in at least one of the mold parts, the airway communicating at one of its ends with the mold cavity through its wall at said at least one position and communicating at its other end with the enclosure defined by said cover means to receive part of the air supplied to the enclosure by the flow means.

7. Apparatus according to claim 1, in which the flow means comprises suction means for applying suction to the mold cavity through its second end.

8. Apparatus according to claim 1, including regulating means for controlling at least one of the following parameters of the flow of air: flow rate, pressure and temperature.

9. Apparatus according to claim 1, in which the closure means comprises closure means movable independently of the movement of the mold parts but parallel to the direction of movement thereof.

10. Apparatus according to claim 9, in which the closure means comprises a pair of closure members mounted adjacent to said at least one open end of the mold cavity, each said closure member being slidably mounted on a respective one of the two mold parts whereby the two closure members of the said pair are movable towards each other to the closed position so as to close off said at least one open end of the mold cavity and away from each other to an open position so as to open that end of the cavity.

11. Apparatus according to claim 10, in which the closure members in moving towards each other to close off said at least one open end of the cavity, pinch the parison between them, whereby, upon movement of the mold parts into the separated position, the corresponding end of the blow-molded article is supported by and between the closure members.

12. Apparatus according to claim 10, in which the closure members at the first end of the mold cavity are shaped to define between them, when in their closed position, a supplementary cavity in communication with the mold cavity.

13. Apparatus according to claim 10, including respective actuator means connected to each closure member for moving the closure members of each said pair between the open and closed position.

14. Apparatus according to claim 1, in which the closure means comprises a respective closure member movably mounted relative to each of the two mold parts so as to be movable in the direction substantially parallel to their directions of movement and between an open position in which it is clear of the respective end of the mold cavity and a closed position in which it closes that end.

15. Apparatus according to claim 14, in which, upon movement of the mold parts into the mutually separated position, the corresponding end of the blow-molded article is supported by the respective closure members.

16. Apparatus according to claim 14, in which the blow-molding means comprises means for supplying blow-molding air or gas into the interior of the parison through the closure member at the said first end of the mold cavity.

17. Molding apparatus for blow-molding an article curved in three dimensions, comprising a base, two mold parts mounted on the base to be slidable in generally horizontal directions towards and away from each other between an open position in which they are separated and a closed position in which they are in contact with each other and together define a mold cavity in three dimensions to match the shape of the article, the mold cavity having upper and lower ends at least the upper of which is open, actuator means operative to move the mold parts into the closed position, cover means positioned above the two mold parts and defining therewith an enclosure in communication with the mold cavity through the upper end thereof, an extrusion head mounted above the upper end of the mold cavity and extending at least partially into the enclosure defined by the cover means for extruding a parison of synthetic resin material into the mold cavity through the upper end and towards the lower end, first air flow means for passing a first flow of air into the enclosure defined by the cover means from outside thereof, said first flow passing through the cavity from the upper end to the lower end and between the outside of the parison and the mold cavity to facilitate the movement of the parison into the mold cavity, second air flow means for passing a second flow of air into the interior of the parison to minimise distortion of the parison during said movement of the parison, blow-molding means operative to blow-mold the parison in the mold cavity after stopping of the first and second flows of air whereby to produce the said article, closure means operative independently of movement of the mold parts to maintain the open end of the mold cavity closed during operation of the blow-molding means, and actuator means for moving the mold parts into the open position to enable removal of the molded article.

18. Apparatus according to claim 17, in which both the upper and lower ends of the mold cavity are open during operation of the extrusion means, and the closure means comprises a first pair of closure members respectively mounted for sliding movement on and relative to the two mold parts adjacent the upper end of the mold cavity and a second pair of closure members respectively mounted on and slidable relative to the two mold parts adjacent the lower end of the mold cavity, said apparatus also including further actuator means for moving the closure members of each said pair towards each other so as to close off the respective end of the mold cavity and, simultaneously, to pinch the parison between them so as to close it off and to grip it, whereby the closure members of each said pair support a respective end of the molded article when the two mold parts are moved to the open position so as to permit the article to be removed on movement of the closure members of each said pair apart from each other.

19. Apparatus according to claim 17, in which the lower end of the mould cavity is closed and the closure means comprises a pair of closure members respectively mounted on and slidable relative to the two mould parts adjacent the upper end of the mould cavity, and actuator means for moving the two mould parts between the open position in which they are separated and the closed position in which they are moved towards each other to close off the upper end of the mould cavity and to pinch the parison between them so as to close it off, whereby to grip the corresponding end of the blow-moulded article and to support it after movement of the mould parts into the separated position.

20. Apparatus according to claim 19, in which the air flow means comprises suction means for applying suction to the lower end of the mould cavity to assist the first flow of air.

21. Apparatus according to claim 20, in which the suction means includes means defining an airway communicating with the lower end of the mould cavity and extending at least partway through at least one of the mould parts.

22. Apparatus according to claim 19, in which the closure means includes two closure members respectively mounted on and slidable relative to the two mould parts adjacent the upper end of the mould cavity and together defining a supplementary cavity communicating with the mould cavity through the upper end thereof.

23. Apparatus according to claim 22, in which the said first flow of air is a flow of air into the supplementary cavity from outside thereof and thence into the mould cavity towards the lower end thereof.

24. Apparatus according to claim 19, in which the closure means comprises respective vertically movable closure members mounted above the upper end of the mould cavity and below the lower end thereof and movable into, so as to close off, the respective ends of the mould cavity, whereby to support the corresponding ends of the blow-moulded article when the two mould parts are moved to the open position, thereby allowing the moulded article to be removed upon vertical movement of the closure members away from the article.

* * * * *